United States Patent
Fu et al.

(10) Patent No.: US 10,111,245 B2
(45) Date of Patent: Oct. 23, 2018

(54) METHOD AND NETWORK ELEMENT FOR SCHEDULING

(71) Applicant: TELEFONAKTIEBOLAGET LM ERICSSON (PUBL), Stockholm (SE)

(72) Inventors: Jing Fu, Solna (SE); Ying Sun, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 17 days.

(21) Appl. No.: 15/320,381

(22) PCT Filed: Jun. 26, 2014

(86) PCT No.: PCT/SE2014/050802
§ 371 (c)(1),
(2) Date: Dec. 20, 2016

(87) PCT Pub. No.: WO2015/199594
PCT Pub. Date: Dec. 30, 2015

(65) Prior Publication Data
US 2017/0164386 A1 Jun. 8, 2017

(51) Int. Cl.
| | |
|---|---|
| H04W 72/10 | (2009.01) |
| H04W 72/12 | (2009.01) |
| H04L 12/865 | (2013.01) |
| H04W 4/06 | (2009.01) |

(52) U.S. Cl.
CPC ..... *H04W 72/1247* (2013.01); *H04L 47/6275* (2013.01); *H04W 72/10* (2013.01); *H04W 72/1231* (2013.01)

(58) Field of Classification Search
CPC ......... H04W 72/1247; H04W 72/1231; H04W 72/10; H04L 47/6275
See application file for complete search history.

(56) References Cited

U.S. PATENT DOCUMENTS

| | | | |
|---|---|---|---|
| 8,417,254 B2* | 4/2013 | Shu | H04W 36/28 455/450 |
| 8,943,554 B2* | 1/2015 | Tran | H04L 63/1416 726/4 |
| 9,066,197 B2* | 6/2015 | Kiukkonen | H04W 52/0229 |
| 9,705,883 B2* | 7/2017 | Zhu | H04L 63/101 |
| 2006/0294044 A1 | 12/2006 | Karlsson et al. | |
| 2007/0258433 A1 | 11/2007 | Speight | |
| 2011/0283001 A1* | 11/2011 | Jung | H04W 28/16 709/227 |

(Continued)

FOREIGN PATENT DOCUMENTS

WO 2013186594 A1 12/2013

*Primary Examiner* — Phuc H Tran
(74) *Attorney, Agent, or Firm* — Sage Patent Group (57) ABSTRACT

A method and an associated network element, computer program and computer product, for scheduling communication devices performed in a network element of a wireless network. The wireless network provides wireless communication for the communication devices. The method comprises identifying one or more of the communication devices as providing tethering for one or more tethered devices, determining a respective scheduling weight for the communication device providing tethering and for its one or more tethered devices, and scheduling the communication devices based on the determination.

15 Claims, 3 Drawing Sheets

(56) References Cited

U.S. PATENT DOCUMENTS

| | | | | |
|---|---|---|---|---|
| 2012/0047204 A1* | 2/2012 | Lee | .................. | H04L 41/082 |
| | | | | 709/203 |
| 2012/0163255 A1* | 6/2012 | Choi | .................. | H04W 4/046 |
| | | | | 370/310 |
| 2012/0269107 A1* | 10/2012 | Palm | .................. | H04W 74/02 |
| | | | | 370/311 |
| 2013/0023260 A1* | 1/2013 | Shu | .................. | H04W 36/28 |
| | | | | 455/418 |
| 2013/0084878 A1 | 4/2013 | Chen et al. | | |
| 2013/0107783 A1* | 5/2013 | Shaw | .................. | H04W 4/06 |
| | | | | 370/312 |
| 2013/0159503 A1 | 6/2013 | Erman et al. | | |
| 2013/0286914 A1* | 10/2013 | Palm | .................. | H04W 74/02 |
| | | | | 370/311 |
| 2014/0200038 A1* | 7/2014 | Rao | .................. | H04W 4/029 |
| | | | | 455/457 |
| 2014/0269430 A1* | 9/2014 | Erman | .................. | H04W 12/12 |
| | | | | 370/254 |

* cited by examiner

METHOD AND NETWORK ELEMENT FOR SCHEDULING

This application is a 371 of International Application No. PCT/SE2014/050802, filed Jun. 26, 2014, the disclosure of which is fully incorporated herein by reference.

TECHNICAL FIELD

The technology disclosed herein relates generally to the field wireless networks and in particular to scheduling of tethering communication devices.

BACKGROUND

Wireless devices such as smart phones are becoming increasingly advanced and comprise an increasing number of functionalities. There are for example smart phones able to provide tethering. The idea of tethering is simple; basically the wireless device uses the wireless network for Internet access, and provides Internet connectivity to other devices using e.g. Wireless Fidelity (Wi-Fi) networks or Bluetooth.

Network operators are typically different from manufacturers of wireless devices and they sometimes have contradicting interests. For example, while smart phone manufacturers want to offer as much functionality as possible in their products, such functionality may not always be in the best interest of the wireless network operator.

For example, many operators of wireless networks are not entirely happy with tethering as they then provide services through one subscription instead of multiple subscriptions. Indeed, some operators have started to disallow tethering and block tethering traffic. In some networks, tethering is allowed only with a specific tethering subscription.

On the other hand, there may be situations wherein the operator would indeed like to ensure satisfaction among tethered devices as well. If a user that is important to the operator of the wireless network, e.g. a bus company, would like to provide Internet access to their passengers they could use an access point device providing access to the wireless network. The passengers could then get Internet access through this access point device by means of e.g. a Bluetooth connection to the access point device. The bus company has a subscription for this access point device and generates potentially high amount of chargeable traffic, the satisfaction of the bus company thus being important to the operator.

However, the base station serving the access point device of the bus company is typically not aware of any tethered devices of this access point device, i.e. the base station is typically unaware of devices not directly connected to it. The base station scheduling only considers wireless devices directly connected to the wireless network. Therefore, the scheduling may lack fairness among the tethered devices, i.e. the passengers' respective device. In particular, a first passengers' tethered device may starve another passengers' tethered device if it has a lot of traffic. In e.g. such case it would be in the interest of the wireless operator as well to provide fairness among the tethered devices.

SUMMARY

An object of the present disclosure is to solve or at least alleviate at least one of the above mentioned problems.

The object is according to a first aspect achieved by a method for scheduling communication devices performed in a network element of a wireless network. The wireless network provides wireless communication for the communication devices. The method comprises identifying one or more of the communication devices as providing tethering for one or more tethered devices; determining a respective scheduling weight for the communication device providing tethering and for its one or more tethered devices; and scheduling the communication devices based on the determination.

By identifying tethering devices and corresponding traffic, and use this as input in scheduling, a scheduling that gives fairness among tethered devices is provided. This may be advantageous for operators of wireless networks for instance for enabling subscribers that want to provide tethering for tethered devices in a manner that is fair for the users of the tethered devices. Such subscribers may for instance comprise bus companies wanting to offer their passengers wireless communication for free.

The object is according to a second aspect achieved by a network element for scheduling communication devices of a wireless network providing wireless communication to the communication devices. The network element is configured to identify one or more of the communication devices as providing tethering for one or more tethered devices, determine a respective scheduling weight for the communication providing tethering and for its one or more tethered devices, and schedule the communication devices based on the determination.

The object is according to a third aspect achieved by a computer program comprising computer program code for causing a network element to perform the method as above when the computer program code is executed on a processor of the network element.

The object is according to a fourth aspect achieved by a computer program product comprising a computer program as above, and a computer readable means on which the computer program is stored.

The object is according to a fifth aspect achieved by a network element comprising first means for identifying one or more of the communication devices as providing tethering for one or more tethered devices, second means for determining a respective scheduling weight for the communication device providing tethering and for its one or more tethered devices, and third means for scheduling the communication devices based on the determination.

Further features and advantages of the present disclosure will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Figure 1:
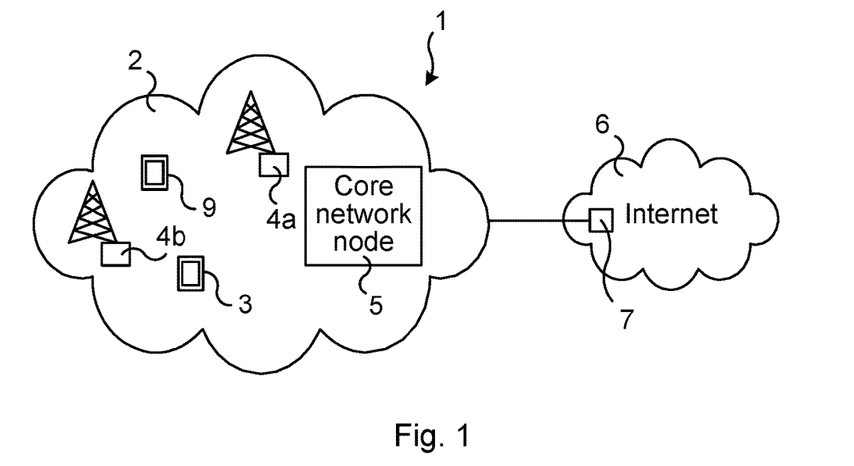
FIG. 1 illustrates schematically an environment in which embodiments of the present disclosure may be implemented.

FIG. 1 illustrates schematically an environment in which embodiments of the present disclosure may be implemented.

A wireless network 2 provides wireless access for a number of communication devices 3, 9. The wireless network 2 may for instance be a Long Term Evolution (LTE) network, and comprises a number of network nodes 4a, 4b enabling the communication devices 3, 9 to communicate over wireless links. Such network nodes 4a, 4b may be denoted in different ways, e.g. radio access node, base station, radio base station, evolved node B (eNB) etc. In the following such network node is denoted base station 4a, 4b. Also the communication devices 3, 9 may be denoted in different ways, e.g. mobile station, wireless device, user equipment (UE), etc. The communication devices 3, 9, in the following denoted UE, may comprise e.g. a smart phone, a tablet etc. Some of the UEs 3, 9 may be tethering other devices (tethered devices), and such UEs are indicated at reference numeral 3. UEs that are not tethering other devices are indicated at reference numeral 9. The wireless network 2 is in the following denoted mobile network 2 in order to clearly differentiate it from other access network, which may also provide wireless communication. In particular, an access network over which the tethered devices and the tethering UE 3 communicate also often provides wireless communication.

The base stations 4a, 4b thus enable UEs 3, 9 to communicate wirelessly. To this end, the base stations 4a, 4b each provide communication coverage in one or more geographical area(s), denoted cells. The wireless network 2 typically comprises various other network nodes, such as Mobility Management Entity (MME), or operation and maintenance (OM) nodes, packet data network gateways, mobility management entities, serving gateways etc. Such other network nodes are collectively and schematically illustrated at reference numeral 4.

The UEs 3, 9 may be equipped with software to offer tethered Internet access, e.g. having functionality for tethering built into their operating system (OS). In the description, in order to differentiate UEs that are currently tethering and those which are not, different reference numerals (3 and 9, respectively) are used. For mobile networks 2 implementing Internet Protocol version 4 (IPv4), the tethering normally works via Network Address Translation (NAT) on the UE's existing data connection, so from the mobile network 2 point-of-view, there is just one UE with a single IPv4 network address.

Briefly, the present disclosure provides, in various embodiments, a method wherein tethered users and tethering traffic is detected in the base station. Based on the identified tethering users and tethering traffic, the base station scheduler performs a more fine-grained scheduling decision. The scheduling method of the present disclosure considers not only the fairness and Quality of Service (QoS) of the UEs connected (directly) to the mobile network 2, but also the fairness and QoS of the devices using a single UE as the tethering device.

Figure 2:
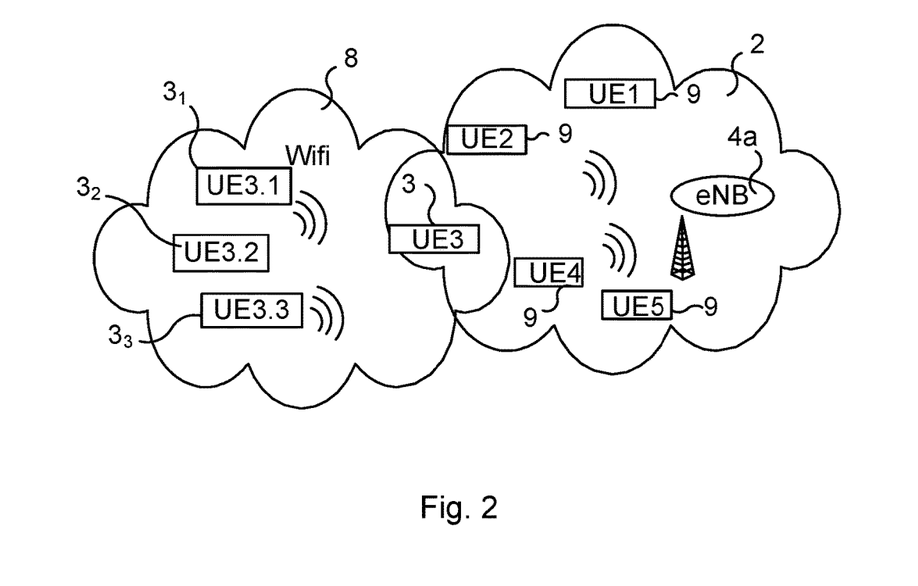
FIG. 2 illustrates a tethering scenario.

FIG. 2 illustrates a tethering scenario comprising a number of UEs (UE1, UE2, UE3, UE4, UE5) communicating over the mobile network 2. Some of these UEs may provide tethering, others do not. In the illustrated case UE3 provides tethering and is thus, adhering to the reference numerals of FIG. 1, indicated by reference numeral 3, while the other UEs are not tethering and are thus indicated at reference numeral 9.

As indicted in the background section, tethering refers to connecting one device to another, and using its Internet connection.

In the context of tethering in mobile networks, a UE 3, 9 connected to the Internet through the mobile network 2 can share the connection with other devices such as for instance laptops. Connection of the UE 3, 9 with other devices can be done over Wireless Local Area Network (WLAN) such as Wireless Fidelity (Wi-Fi), over Bluetooth or by a physical connection in the form of a cable, for example through Universal Serial Bus (USB). The access network 8 over which the tethering UE 3 communicates with tethered devices, denoted UE 3.1, UE 3.2, UE 3.3 in FIG. 2, is in the following denoted tethering network 8.

FIG. 2 thus illustrates a scenario of the tethering user case. In the illustrated case there are five UEs served by a base station 4a in the mobile network 2, namely UEs denoted UE1, UE2, UE3, UE4, UE5. One of them, UE3 in the following denoted tethering device UE 3, also functions as a tethering device for other devices using the tethering network 8 (exemplified by Wifi in the FIG. 2). In particular, there are three tethered devices UE 3.1, UE 3.2, UE 3.3 using the connection that the tethering device UE 3 has in the mobile network 2.

The present disclosure aims at making fair scheduling of the tethered devices UE 3.1, UE 3.2 and UE 3.3, with the functionality residing in a network node (base station) of the mobile network 2.

Figure 3:
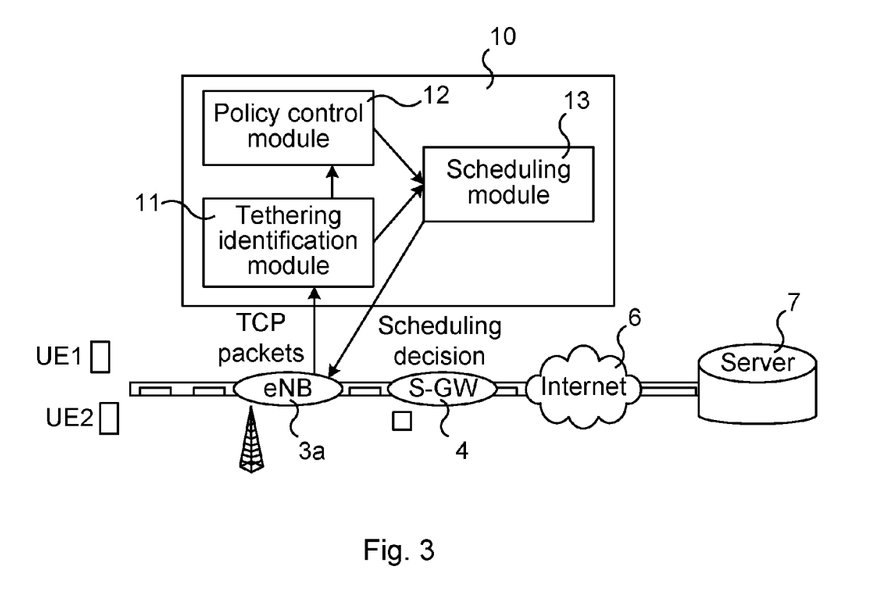
FIG. 3 is another illustration of an environment in which embodiments of the present disclosure may be implemented.

FIG. 3 illustrates a system architecture for implementing aspects of the present disclosure. A network element 10 is provided, which may be an integrated part of the base station 4a, or a standalone node. The network element 10 comprises, in an embodiment, a tethering identification module 11 which detects tethering users and tethered traffic, a policy module 12 and a scheduling module 13. The network element 10 identifies multiple UEs on a single connection and provides a fair scheduling among all users, including tethering, non-tethering and tethered devices.

The information from the tethering identification module 11 is fed into the policy module 12 and the scheduling module 13. A main task of the policy control module's 12 is to control each user's scheduling priorities based on subscription type, QoS and information from the tethering identification module 11. The output from policy control module 12 is fed into the scheduling module 13 which schedules traffic flows with more fine-grained QoS and channel quality in consideration than current scheduling.

The tethering identification module 11 is used for detecting tethering traffic and users. There are known methods to detect tethering traffic, which methods could be implemented by the tethering identification module 11. One approach is to let the tethering device to log its tethered devices and tethered traffic, and report this information in detail to the tethering identification module 11 through the wireless link. This approach is simple to implement and is also very accurate in identifying tethered traffic, however requiring the cooperation of the UE 3 (tethering device). Another approach is for the base station 4a to have a packet probe and analyze Transport Control Protocol (TCP) and application headers of TCP packets from the tethering UE3. If implemented in the UE 3, it reports this to the tethering identification module 11. For example, certain UE types may use specific ports when tethering, which could thus be used for identifying the UE as being a tethering UE. Also, in some application layer protocols, such as Hyper Text Transport Protocol (HTTP), browser type and operating system (OS) type are reported in HTTP requests. With different heuristics, tethering users and traffic can be identified based on such information. For example, if the traffic from a certain UE comprises packets indicating use of different types of browsers and operating systems (OSs), it may be assumed that this certain UE is a tethering device. In addition, HTTP requests from different OS types and coming from one UE are in general from different tethered devices, and the UE can then be identified as a tethering device.

Tethering identification module 11 may use a Deep Packet Inspection (DPI) probe to analyze packets going through the base station 4a. By, for instance, analyzing the IP, TCP and application headers, the tethering identification module 11 may construct a data base comprising a tethering user table and tethering traffic table. Examples of such tables are shown below in Table 1 and Table 2, respectively.

TABLE 1

Tethering user table

| User ID | UE type | OS | TCP ports | Browser types | Other |
|---------|---------|---------|-----------|---------------|-------|
| 3 | IPhone | IOS 5 | 0-999 | Safari | Not known |
| 3.1 | HP Laptop | Windows 8 | 1000-2000 | Chrome | Screen size: 14 |
| 3.2 | Not known | Android | Not known | Not known | Not known |
| 3.3 | Dell | Linux | Not known | Not known | Not known |

TABLE 2

Tethering traffic table

| Client port | Protocol type | Server IP | Server ports | UE ID |
|-------------|---------------|-----------|--------------|-------|
| 1555 | TCP | 172.0.0.1 | 25 | 3 |
| 1556 | UDP | | | 3.1 |
| 2301 | TCP | 213.10.21.1 | 80 | 3.2 |
| 3456 | TCP | 80.0.0.1 | 80 | 3.3 |

The tethering user table provides an identification (ID) for each user and each tethered user in the base station 4a. Users that are directly connected to the mobile network 2 are named as user 1, user 2, user 3, etc. The tethered users using user 1 as the tethering device are named as user 1.1, user 1.2, and so on.

The tethering user table (Table 1) comprises information about the different UEs, i.e. the tethering devices 3 as well as their tethered devices 3.1, 3.2, 3.3 (only one tethering device is this example with three tethered devices). Such information may for example comprise UE type, OS, the common TCP ports used, browser types, screen size, etc. It is not always possible to obtain all types of information for all devices and some information may thus not be always available, as indicated in the table by "Not known". All or some information of the tethering user table (Table 1) is fed into the policy control module 12 for checking each user's, tethering as well as tethered, scheduling policies.

In the tethering traffic table (Table 2) each identified traffic flow (TCP or User Datagram Protocol, UDP) is tagged with a user ID. For example, traffic flow on client port 1555 is tagged with user ID 3, traffic flow on client port 1556 is tagged with user ID 3.1. The constructed tethering traffic table (Table 2) is also fed into the scheduling module 13 for use in the scheduling.

The mechanisms for obtaining the values of the tables (Table 1, Table 2) are known as such, e.g. how to identify tethering devices and tethered traffic.

The policy control module 12, having received information from the tethering identification module 11 about the identities of the users, may obtain information such as QoS Class Identifier (QCI) configured on each user, priority of each user, packet delay budget for each user, scheduling strategy for each user (e.g. delay based scheduling (DBS), round robin (RR), proportional fair (PF)), and buffer size for each user. The policy control module 12 may for instance obtain such information from a Policy and charging rules Function (PCRF), which is available e.g. in LTE networks, and/or user's subscription types. Based on the configured QCI, the QoS requirements are decided for all UEs (tethering devices, non-tethering devices, and tethered devices).

Table 3 is an example on QoS configuration and scheduling policy information of all users in the mobile network 2 (including tethering devices, non-tethering devices, and tethered devices).

TABLE 3

| User ID | Configured QCI | Priority | Packet Delay Budget | Scheduling strategy | Buffer size (bits) |
|---------|----------------|----------|---------------------|---------------------|--------------------|
| 1 | QCI 1 | P1 | 100 | Delay based scheduling (DBS) | 30 |
| 2 | QCI5 | P2 | — | Round robin (RR) | 60 |
| 3 | QCI 5 | P3 | — | Round robin (RR) | 60 |
| 3.1 | QCI1 | P3.1 | 100 | Delay based scheduling (DBS) | 30 |
| 3.2 | QCI9 | P3.2 | — | Round robin (RR) | 50 |
| 3.3 | QCI3 | P3.3 | — | Proportional Fair (PF) | 10 |

In an aspect of the present disclosure, the scheduling strategy and resource allocation strategy may be determined for each UE based on their respective configured QCI.

Policy control module 12 thus comprises all users QoS configuration and scheduling policy information. For example in Table 3, it can be concluded that user with User ID 3 is the mobile network 2 (e.g. LTE) capable users, but the other users, 3.1, 3.2, and 3.3 are supported by user 3 over a tethering network 8 (e.g. WiFi) to connect to the mobile network 2 (e.g. LTE).

According to an aspect of the present disclosure, the policy control module 12 thus feeds information to scheduling module 13 for enabling the scheduling module 13 to make a scheduling decision. The information is thus sent to the scheduling module 13, which in turn is going to allocate resource to the users accordingly.

The scheduling module 13 may be based on a conventional base station scheduler, e.g. LTE base station scheduler performing resource allocation for the UEs directly connected to it. However, the scheduling module 13 also performs, according to the present disclosure, resource allocation for tethered users (e.g. UE3.1, UE3.2, UE3.3). That is, the scheduling module 13 performs resource allocation for each user including both (direct) mobile network 2 users (e.g. LTE users) and (indirect) tethered users.

Based on the input parameters received from policy control function 12, the scheduling module 13 first computes scheduling information as necessary, e.g. information such as channel quality, scheduling weight, buffer status of scheduling candidates (i.e. users to be scheduled).

In various embodiments, the channel quality of the tethered UEs, i.e. UE 3.1, UE 3.2, UE 3.3, is set to the channel quality of the UE supporting LTE, i.e. the channel quality of UE 3.

In this example (refer to table 4 below), the channel quality Q3.1=Q3.2=Q3.3=Q3

The scheduling weight $W_i$ and the buffer status $B_i$ computation can be based on various scheduling policies. Two examples of such scheduling policies will be given in the following, a greedy scheduling policy and a less greedy scheduling policy. It is however noted that other scheduling policies may be used, e.g. delay based scheduling, or proportional fair scheduling.

First a greedy scheduling policy is described. In the greedy scheduling policy the resource allocation is allocated strictly according to the priority level $P_1$, $P_2$, $P_3$, $P_{3.1}$, $P_{3.2}$, $P_{3.3}$ of all the users (refer to Table 3), as obtained in the policy control module 12. The scheduling module 13 computes the scheduling weights of all UEs according to a scheduling weight function f (scheduling function, P1) based on information received from the policy control module 12. The scheduling weight is thus calculated based on different scheduling strategies and priority levels for the different users. For example, scheduling weight $W_i$ of user 1 is computed based on round robin weight function with priority level $P_1$ as input. Correspondingly, the scheduling weights W2 and W3 for users 2 and 3, respectively, are calculated based on Round Robin scheduling strategy using their respective priority levels $P_2$, $P_3$ as input. The scheduling weight $W_{3.3}$ for tethered user with user ID 3.3 is calculated using Proportional fair scheduling strategy and the priority $P_{3.3}$ of user with ID 3.3 as input.

The buffer size in uplink is obtained in buffer status reports from the UEs, and buffer size in downlink is obtained from knowledge about the queued data size in each priority queue.

TABLE 4

| User ID | Channel Quality | Scheduling Weight | Buffer size (bits) |
|---|---|---|---|
| 1 | Q1 | W1 = f(RR, P1) | B1 |
| 2 | Q2 | W2 = f(RR, P2) | B2 |
| 3 | Q3 | W3 = f(RR, P3) | B3 |
| 3.1 | Q3 | W3.1 = f(DBS, P3.1) | B3.1 |
| 3.2 | Q3 | W3.2 = f(RR, P3.2) | B3.2 |
| 3.3 | Q3 | W3.3 = f(PF, P3.3) | B3.3 |

According to the greedy scheduling policy, the scheduling module 13 selects the user with highest scheduling weight $W_i$ and allocates as much resource as possible to empty downlink/uplink buffer size of the user with this highest scheduling weight. The tethered UEs are treated as individual UEs and allocated accordingly in a same way as "normal" UEs, i.e. UEs actually having a connection to the mobile network 2.

As is known, a base station allocates downlink radio resources to a UE using resource allocation information called downlink assignment, and allocates uplink radio resources to the UE using resource allocation information called uplink grant. The downlink assignment and the uplink grant are signaled separately to the UE through the Physical Downlink Control Channel (PDCCH), e.g. the downlink resource allocation comprising indicies of the allocated resource blocks.

If for instance the tethering UE, i.e. UE with user ID 3 is determined to have the highest weight, it gets a downlink grant first. If one of its tethered devices, e.g. UE with user UE 3.3 has the next highest weight, it will get a downlink grant next. The resources for such tethered user (UE 3.3) are provided via its tethering device (UE 3). The weights $W_{3.1}$, $W_{3.2}$, $W_{3.3}$ of the tethered devices need not be equal, as they might have different scheduling schemes. For instance, in the example shown in Table 4, the tethered devices have different scheduling schemes, wherein UE3.1 has Delay-based scheduling strategy, UE3.2 has round robin based scheduling strategy, and UE3.3 has a proportional fair scheduling strategy. There is no free riding of low priority traffic from tethered UEs if there is still high priority UEs to be scheduled. That is, the tethered devices UE 3.1, UE 3.2, UE 3.3 as well as the tethering devices 3 and non-tethering devices (User IDs 1 and 2 of table 4) get resources according to their respective scheduling weight.

The scheme provides the best QoS performance in that all users follow the QoS priority strictly. However, special update on PDCCH assignment/grant format needs to be done so that LTE resources could be allocated also for tethered users. For instance, the grant/assignment should include the proportion of resources used by tethered users.

Next, a less greedy scheduling policy is described. In this scheduling scheme, the scheduling module 13 only allocates resources for mobile network 2 (e.g. LTE) users. The mobile network 2 (e.g. LTE) users that provide tethering distribute resources to their tethered users. The scheduling weight $W_i$ and buffer status information $B_i$ of mobile network 2 (e.g. LTE) users need to be calculated taking into account tethering users information.

In the above example, the scheduling weight $W_i$ of the mobile network 2 (e.g. LTE) users providing tethering (user 3) can be computed as maximum weight of all tethering users, i.e. according to:

$$W3\text{int}=\max(W3,W3.1,W3.2,W3.3)$$

It is assumed that the scheduling weight of user 3, user 3.1, user 3.2 and user 3.3 are, W3, W3.1, W3.2, and W3.3, respectively, where W3, W3.1, W3.2, and W3.3 can e.g. be computed according to Table 4. That is, W3=f(RR,$P_3$), W3.1=f(DBS,$P_{3.1}$), W3.2=f(RR,$P_{3.2}$) and W3.3=f(PF,$P_{3.3}$)

The buffer status of the mobile network 2 (e.g. LTE) user can be calculated as the sum of its own buffer status and the buffer statues of its tethered devices. For example, the buffer status B3*int* of user with User ID 3 providing tethering can be computed according to:

$$B3\text{int}=B3+B3.1+B3.2+B3.3$$

where the buffer status information of user 3, user 3.1, user 3.2 and user 3.3 are, B3, B3.1, B3.2, and B3.3, respectively and given as shown in Table 4.

The scheduling candidate lists maintained in the scheduling module 13 is then as Table 5 below.

TABLE 5

| User ID | Channel Quality | Scheduling Weight | Buffer size (bits) |
|---|---|---|---|
| 1 | Q1 | W1 | B1 |
| 2 | Q2 | W2 | B2 |
| 3 | Q3 | W3int | B3int |

Among the scheduling candidate lists, the scheduling module 13 selects the scheduling candidate with highest scheduling weight and allocates as much resource as possible to empty buffer size following the existing resource allocation scheme.

Compared to the traditional tethering scheme where tethered users are not known by the mobile network 2 (e.g. LTE) scheduler, this scheduling scheme provides improved QoS performance for the tethered users. In contrast to the greedy policy proposed in the present disclosure, no control signaling (e.g. PDCCH) updates are needed for the less greedy scheduling policy. However, potential free riders in the form of low priority tethered users might steal resources from other mobile network 2 (e.g. LTE) users that have higher priority. However in case resources are not limited free riding is in most cases not a problem. This is for example typically the case for Physical Uplink Shared Channel (PUSCH) for uplink.

An advantage of the present disclosure is the providing of fairness and QoS in scheduling among users including both ordinary mobile network 2 users (e.g. LTE users) and tethering users. This prevents a tethering device from getting starved by other tethering users. Additionally, scheduling policies in the base station can be set so that the tethering users can be treated more equally as "normal" mobile users (i.e. the mobile network users having an own connection in the mobile network").

Further, the methods of the present disclosure may be implemented entirely in a network node, e.g. a base station, and does not require or rely on any reporting from a tethering hot-spot (i.e. a tethering device) about number of tethering devices.

Figure 4:
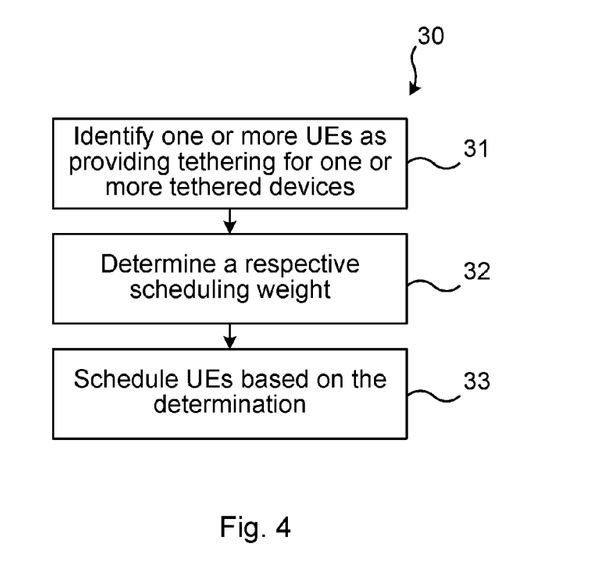
FIG. 4 illustrates a flow chart over steps of a method in a network element in accordance with the present disclosure.

The features that have been described may be combined in various ways, examples of which are given in the following. FIG. 4 thus illustrates a flow chart over steps of a method in a network element 10.

FIG. 4 illustrates a flow chart over steps of a method in a network element in accordance with the present disclosure.

A method 30 is provided for scheduling communication devices 3, 9 and performed in a network element 10 of a wireless network 2. The wireless network 2 provides wireless communication for the communication devices 3, 9. The method 30 comprises identifying 31 one or more of the communication devices 3 as providing tethering for one or more tethered devices 3.1, 3.2, 3.3. The identifying 31 may be performed e.g. by using a packet probe and analyze Transport Control Protocol (TCP) and application headers of TCP packets from the tethering communication device 3.

The method 30 comprises determining 32 a respective scheduling weight $W_3$, $W_{3.1}$, $W_{3.2}$, $W_{3.3}$ for the communication device 3 providing tethering and for its one or more tethered devices 3.1, 3.2, 3.3.

The method 30 comprises scheduling 33 the communication devices 3, 9 based on the determination.

In an embodiment, the determining 32 comprises determining the respective scheduling weights $W_3$, $W_{3.1}$, $W_{3.2}$, $W_{3.3}$ based on a respective scheduling scheme and priority of each of the communication devices 3 providing tethering and each of the one or more tethered devices 3.1, 3.2, 3.3.

In an embodiment, the scheduling 33 comprises scheduling resources for the communication device 3, 9 or tethered device 3.1, 3.2, 3.3 having the highest scheduling weight $W_3$, $W_{3.1}$, $W_{3.2}$, $W_{3.3}$, wherein for the case of a tethered device 3.1, 3.2, 3.3 having the highest scheduling weight, the scheduled resources is provided through the communication device 3 providing the tethering.

In an embodiment, the scheduling 33 comprises:
determining the scheduling weight of a communication device 3 identified as providing tethering for one or more tethered devices 3.1, 3.2, 3.3 to be equal to the maximum of the scheduling weight of the communication device 3 identified as providing tethering for one or more tethered devices 3.1, 3.2, 3.3 and the respective scheduling weights of the tethered devices 3.1, 3.2, 3.3, and scheduling resources for the communication device 3, 9 having the highest scheduling weight.

In an embodiment, the scheduling 33 comprises, for downlink traffic, scheduling and transmitting traffic downlink from a packet queue to the communication device 3, and for uplink traffic, scheduling and transmitting uplink grants to the communication device 3.

In an embodiment, the determining 32 is further based on channel quality and/or buffer size of the identified one or more communication devices 3 and/or buffer size of the one or more tethered devices 3.1, 3.2, 3.3.

In a variation of the above embodiment, the channel quality of tethered devices 3.1, 3.2, 3.3 is set equal to the channel quality of the communication device 3 providing them the tethering.

In an embodiment, the method 30 comprises:
identifying for each of the one or more tethering devices 3.1, 3.2, 3.3 a respective traffic flow, and determining based thereon a respective buffer size $B_{3.1}$, $B_{3.2}$, $B_{3.3}$ of the tethered devices 3.1, 3.2, 3.3.

In an embodiment, the identifying 31 comprises:
receiving information from a tethering device 3 that it has tethered devices 3.1, 3.2, 3.3 and/or information about its respective traffic flows belonging to a respective tethered device 3.1, 3.2, 3.3, or analyzing packets received from the communication devices 3, 9, or detecting a tethering communication device 3 based on one or more of: port number, browser type, operating system, type of communication device, application header, Internet Protocol header, Transport Control Protocol header.

Figure 5:
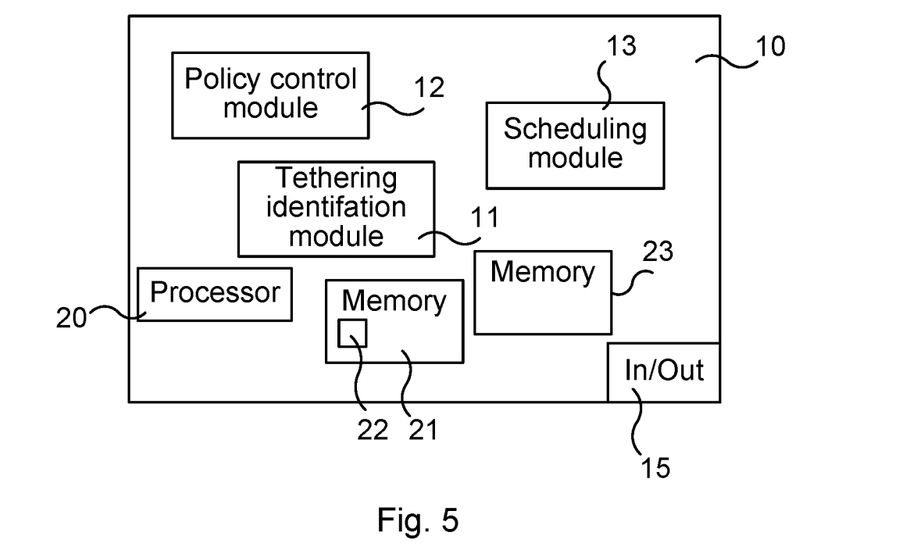
FIG. 5 illustrates schematically a network element and means for implementing embodiments of the method of the present disclosure.

FIG. 5 illustrates schematically a network element 10 and means for implementing embodiments of the method of the present disclosure. The network element 10 may for example comprise a scheduling device of a base station. The network element 10 comprises an input/output device 15 for communicating with other entities e.g. of a base station. The input/output device 15 may comprise an interface for receiving various input data for use in a scheduling decision and for outputting a scheduling decision.

The network element 10 comprises tethering identification module 11, a policy control module 12 and a scheduling module 13, the functions of which have been described earlier. These modules 11, 12, 13 may be implemented using hardware and/or software.

The network element 10 comprises a processor 20 comprising any combination of one or more of a central processing unit (CPU), multiprocessor, microcontroller, digital signal processor (DSP), application specific integrated circuit etc. capable of executing software instructions stored in a memory 21, which can thus be a computer program product 21. The processor 20 can be configured to execute any of the various embodiments of the method as described for instance in relation to FIG. 4.

In particular, a network element 10 is provided for scheduling communication devices 3, 9 of a wireless network 2 providing wireless communication to the communication devices 3, 9. The network element 10 is configured to:
identify one or more of the communication devices 3 as providing tethering for one or more tethered devices 3.1, 3.2, 3.3, determine a respective scheduling weight $W_3$, $W_{3.1}$, $W_{3.2}$, $W_{3.3}$ for the communication device 3 providing tethering and for its one or more tethered devices 3.1, 3.2, 3.3, and schedule the communication devices 3, 9 based on the determination.

The network element 10 may for example be configured to perform these functions by comprising at least one processor 20 and memory 21, wherein the memory 21 contains instructions executable by the processor 20, whereby the network element 10 is operative to perform the above functions.

In an embodiment, the network element 10 is configured to determine the respective scheduling weights $W_3$, $W_{3.1}$, $W_{3.2}$, $W_{3.3}$ based on a respective scheduling scheme and priority of each of the communication devices 3 providing tethering and each of the one or more tethered devices 3.1, 3.2, 3.3.

In an embodiment, the network element 10 is configured to schedule resources for the communication device 3, 9 or tethered device 3.1, 3.2, 3.3 having the highest scheduling weight $W_3$, $W_{3.1}$, $W_{3.2}$, $W_{3.3}$, wherein for the case of a tethered device 3.1, 3.2, 3.3 having the highest scheduling weight, the scheduled resources is provided through the communication device 3 providing the tethering.

In an embodiment, the network element 10 is configured to schedule by:

determining the scheduling weight of a communication device 3 identified as providing tethering for one or more tethered devices 3.1, 3.2, 3.3 to be equal to the maximum of the scheduling weight of the communication device 3 identified as providing tethering for one or more tethered devices 3.1, 3.2, 3.3 and the respective scheduling weights of the tethered devices 3.1, 3.2, 3.3, and scheduling resources for the communication device 3, 9 having the highest scheduling weight.

In an embodiment, the network element 10 is configured to schedule by, for downlink traffic, scheduling and transmitting traffic downlink from a packet queue to the communication device 3, and for uplink traffic, scheduling and transmitting uplink grants to the communication device 3.

In an embodiment, the network element 10 is configured to determine further based on channel quality and/or buffer size of the identified one or more communication devices 3 and/or buffer size of the one or more tethered devices 3.1, 3.2, 3.3.

In an embodiment, the network element 10 is configured to set the channel quality of tethered devices 3.1, 3.2, 3.3 equal to the channel quality of the communication device 3 providing them the tethering.

In an embodiment, the network element 10 is configured to identify for each of the one or more tethering devices 3.1, 3.2, 3.3 a respective traffic flow, and determining based thereon a respective buffer size $B_{3.1}$, $B_{3.2}$, $B_{3.3}$ of the tethered devices 3.1, 3.2, 3.3.

In an embodiment, the network element 10 is configured to identify by:

receiving information from a tethering device 3 that it has tethered devices 3.1, 3.2, 3.3 and/or information about its respective traffic flows belonging to a respective tethered device 3.1, 3.2, 3.3, or analyzing packets received from the communication devices 3, 9, or detecting a tethering communication device 3 based on one or more of: port number, browser type, operating system, type of communication device, application header, Internet Protocol header, Transport Control Protocol header.

Still with reference to FIG. 5, the memory 21 can be any combination of random access memory (RAM) and read only memory (ROM), Flash memory, magnetic tape, Compact Disc (CD)-ROM, digital versatile disc (DVD), Blueray disc etc. The memory 21 may also comprise persistent storage, which, for example, can be any single one or combination of magnetic memory, optical memory, solid state memory or even remotely mounted memory.

A data memory 23 may also be provided for reading and/or storing data during execution of software instructions in the processor 20. The data memory 23 may for instance be any combination of random access memory (RAM) and read only memory (ROM).

The present disclosure also encompasses computer program 22 comprising computer program code for causing a network element 10 to perform the method for instance as described in relation to FIG. 4, when the computer program code is executed on a processor 20 of the network element 10.

The present disclosure also encompasses a computer program product 21 as above, and a computer readable means on which the computer program 22 is stored.

Figure 6:
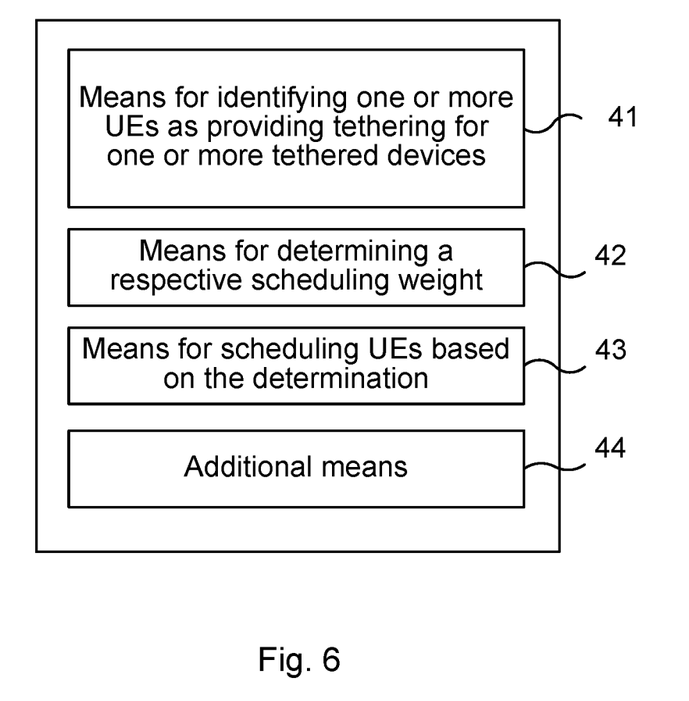
FIG. 6 illustrates a network element comprising function modules/software modules for implementing embodiments of the method of the present disclosure.

An example of an implementation using function modules/software modules is illustrated in FIG. 6, in particular illustrating a network element 10 comprising function modules and/or software modules for implementing embodiments of the method 3. The network element 10 comprises first means 41 for identifying one or more of the communication devices 3 as providing tethering for one or more tethered devices 3.1, 3.2, 3.3. Such means may for example comprise processing circuitry adapted to perform this identification using program code stored in a memory.

The network element 10 comprises second means 42 for determining a respective scheduling weight $W_3$, $W_{3.1}$, $W_{3.2}$, $W_{3.3}$ for the communication device 3 providing tethering and for its one or more tethered devices 3.1, 3.2, 3.3. Such means may for example comprise processing circuitry adapted to perform this determination using program code stored in a memory.

The network element 10 comprises third means 43 for scheduling the communication devices 3, 9 based on the determination. Such means may for example comprise processing circuitry adapted to perform this scheduling using program code stored in a memory.

The network element 10 may comprise yet additional means, schematically illustrated at reference numeral 44, for carrying out any of the steps of the various embodiments of the method 20. For example, means may be provided for determining the respective scheduling weights $W_3$, $W_{3.1}$, $W_{3.2}$, $W_{3.3}$ based on a respective scheduling scheme and priority of each of the communication devices 3 providing tethering and each of the one or more tethered devices 3.1, 3.2, 3.3.

The function modules 41, 42, 43, 44 may thus be implemented using software instructions such as computer program executing in a processor and/or using hardware, such as application specific integrated circuits, field programmable gate arrays, discrete logical components etc.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method for scheduling communication devices performed in a network element of a wireless network, the wireless network providing wireless communication for the communication devices, the method comprising:
   identifying one or more of the communication devices as providing tethering for one or more tethered devices;
   determining a respective scheduling weight for the communication device providing tethering and for its one or more tethered devices; and
   scheduling the communication devices based on the determination, wherein the scheduling comprises scheduling resources for the communication device providing tethering or for one of the tethered devices having a highest scheduling weight, wherein for the case of the one or the tethered devices having the highest scheduling weight, the scheduled resources are provided through the communication device providing tethering.

2. The method as claimed in claim 1, wherein the determining comprises determining the respective scheduling weights based on a respective scheduling scheme and priority of each of the communication devices providing tethering and each of the one or more tethered devices.

3. The method as claimed in claim 1, wherein the scheduling comprises:
   determining the scheduling weight of a communication device identified as providing tethering for one or more tethered devices to be equal to the maximum of the scheduling weight of the communication device identified as providing tethering for one or more tethered devices and the respective scheduling weights of the tethered devices; and
   scheduling resources for the communication device having the highest scheduling weight.

4. The method as claimed in claim 1, wherein the scheduling comprises, for downlink traffic, scheduling and transmitting traffic downlink from a packet queue to the communication device, and for uplink traffic, scheduling and transmitting uplink grants to the communication device.

5. The method as claimed in claim 1, wherein the determining is further based on channel quality and/or buffer size of the identified one or more communication devices and/or buffer size of the one or more tethered devices.

6. The method as claimed in claim 1, comprising:
   identifying for each of the one or more tethering devices a respective traffic flow, and
   determining based thereon a respective buffer size of the tethered devices.

7. The method as claimed in claim 1, wherein the identifying comprises:
   receiving information from a tethering device that it has tethered devices and/or information about its respective traffic flows belonging to a respective tethered device; or
   analyzing packets received from the communication devices; or
   detecting a tethering communication device based on one or more of: port number, browser type, operating system, type of communication device, application header, Internet Protocol header, Transport Control Protocol header.

8. A network element for scheduling communication devices of a wireless network providing wireless communication to the communication devices, the network element being configured to:
   identify one or more of the communication devices as providing tethering for one or more tethered devices;
   determine a respective scheduling weight for the communication device providing tethering and for its one or more tethered devices; and
   schedule the communication devices based on the determination, wherein the network element schedules the communication devices by scheduling resources for the communication device providing tethering or one of the tethered devices having a highest scheduling weight, wherein for the case of a tethered device having the highest scheduling weight, the scheduled resources are provided through the communication device providing tethering.

9. The network element as claimed in claim 8, configured to determine the respective scheduling weights based on a respective scheduling scheme and priority of each of the communication devices providing tethering and each of the one or more tethered devices.

10. The network element as claimed in claim 8, configured to schedule by:
    determining the scheduling weight of a communication device identified as providing tethering for one or more tethered devices to be equal to the maximum of the scheduling weight of the communication device identified as providing tethering for one or more tethered devices and the respective scheduling weights of the tethered devices; and
    scheduling resources for the communication device having the highest scheduling weight.

11. The network element as claimed in claim 8, configured to schedule by, for downlink traffic, scheduling and transmitting traffic downlink from a packet queue to the communication device, and for uplink traffic, scheduling and transmitting uplink grants to the communication device.

12. The network element as claimed in claim 8, configured to determine further based on channel quality and/or buffer size of the identified one or more communication devices and/or buffer size of the one or more tethered devices.

13. The network element as claimed in claim 8, configured to: identify for each of the one or more tethering devices a respective traffic flow, and determining based thereon a respective buffer size of the tethered devices.

14. The network element as claimed in claim 8, configured to identify by:
    receiving information from a tethering device that it has tethered devices and/or information about its respective traffic flows belonging to a respective tethered device; or
    analyzing packets received from the communication devices; or
    detecting a tethering communication device based on one or more of: port number, browser type, operating system, type of communication device, application header, Internet Protocol header, Transport Control Protocol header.

15. A non-transitory computer-readable medium comprising computer program code for causing a network element to perform the method as claimed in claim 1 when the computer program code is executed on a processor of the network element.

* * * * *